(12) United States Patent
Lohn et al.

(10) Patent No.: US 6,539,703 B1
(45) Date of Patent: Apr. 1, 2003

(54) SPACECRAFT COMPONENT WITH MICROTHRUSTER ACTUATION AND OPERATION THEREOF

(75) Inventors: Peter D. Lohn, Torrance, CA (US); David H. Lewis, Irvine, CA (US)

(73) Assignee: TRW Inc., Redondo Beach, CA (US)

( * ) Notice: Subject to any disclaimer, the term of this patent is extended or adjusted under 35 U.S.C. 154(b) by 30 days.

(21) Appl. No.: 09/948,035

(22) Filed: Sep. 5, 2001

(51) Int. Cl.[7] .................................................. F03H 5/00
(52) U.S. Cl. ......................................... 60/203.1; 60/204
(58) Field of Search ................................ 60/204, 203.1; 137/68.19; 244/169

(56) References Cited

U.S. PATENT DOCUMENTS 6,131,385 A   10/2000  Lewis, Jr.
6,263,665 B1 * 7/2001  Ketsdever et al . ......... 60/203.1
6,378,292 B1 * 4/2002  Youngner ..................... 60/224
6,487,844 B1   12/2002  Lohn et al.

OTHER PUBLICATIONS

"Fomenting A Revolution, In Miniature", Oct. 16, 1998, vol. 282 Science.
"Little Bangs", Scientific American Nov. 1998.

\* cited by examiner

*Primary Examiner*—Ehud Gartenberg
(74) *Attorney, Agent, or Firm*—Antonelli, Terry, Stout & Kraus, LLP

(57) ABSTRACT

A spacecraft component (20) includes a plurality of parts, e.g., a first part (22) and a second part (23) connected to one another, at least the first part (22) being mounted for movement with respect to another of the parts, e.g., the second part (23). At least one microthruster (27) is provided on the first part for actuation thereof and includes a chamber (2, 14), a fluid provided in the chamber and a diaphragm (3, 13) covering an opening in the chamber (2, 14).

14 Claims, 4 Drawing Sheets

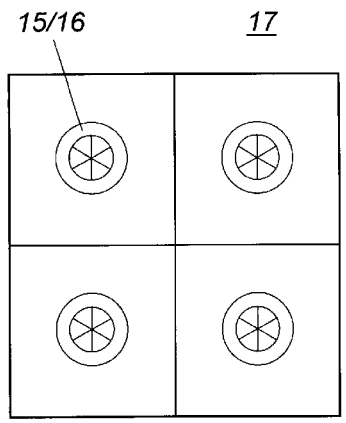
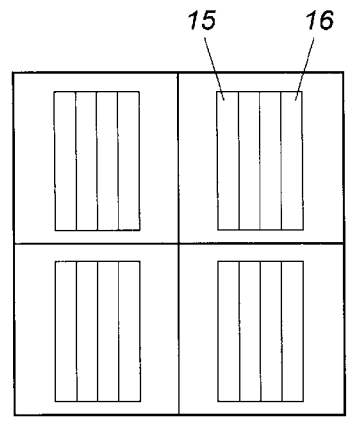
2 x 2 Array of Axis Symmetric Elements
Figure 7A
2 x 2 Array of Linear Elements
Figure 7B
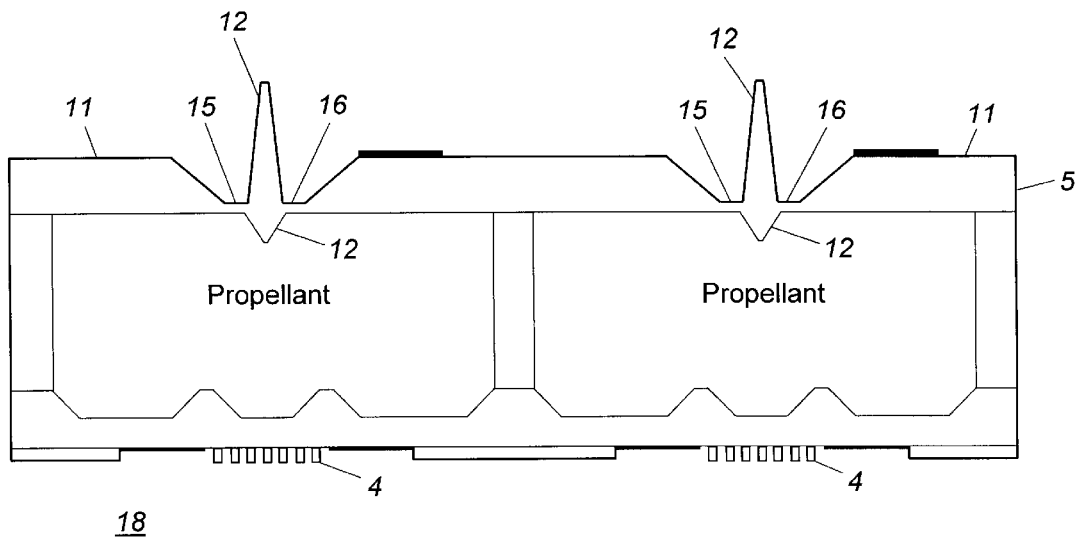
Figure 8

SPACECRAFT COMPONENT WITH MICROTHRUSTER ACTUATION AND OPERATION THEREOF

CROSS-REFERENCE TO RELATED APPLICATION

Reference is made to commonly assigned U.S. patent application Ser. No. 08/912,709, filed Aug. 18, 1997 for Integrated Pulsed Propulsion and Structural Support System for Microsatellite (now U.S. Pat. No. 6,131,385), and U.S. patent application Ser. No. 09/449,427, filed Nov. 24, 1999 (now U.S. Pat. No. 6,487,844) for Aerospike Augmentation of Microthruster Impulse, the disclosures of each of which are hereby incorporated by reference.

BACKGROUND OF THE INVENTION

In the space environment, it is of utmost importance that spacecraft components be deployed, moved, oriented and actuated in a reliable, fine-tuneable and fail-safe manner. Many spacecraft components, e.g., spacecraft booms, solar panels, antennas, payloads, instruments, sensors, satellite modules, separated hardware and star trackers, have parts which must be moved, either in a linear or pivoting manner with respect to other parts. In moving the parts with respect to one another, conventional, mechanical actuation is the current standard. However, it is desired to provide a more flexible and reliable operation in the space environment.

Micro-electrcomechanical systems (MEMS) have been proposed for propulsion systems that could be used to position or propel microsatellites for space, defense and communications applications, as well as for other uses.

The use of extremely small thrust impulse bits in packages of sub-millimeter length scales is under consideration for a wide variety of applications. The small size has so far made it desirable to keep the construction simple by producing only a simple burst disk nozzle opening. Upon opening a burst disk, the gas expels from the thrust chamber and produces an impulse. U.S. Pat. No. 6,131,385 referred to above discloses an integrated pulsed propulsion and structural support system for a microsatellite employing a microthruster capable of being fabricated by batch processing similar to integrated microelectronics.

Commonly assigned U.S. patent application Ser. No. 09/449,427 referred to above discloses an improved microthruster that will provide both higher thrust efficiency and more controllable and uniform impulse characteristics, and will make the magnitude of the impulse from microthrusters more uniform and controllable. That application discloses a microthruster, which comprises a closed chamber for carrying a fluid with a portion of the chamber less resistant to rupture from elevated fluid pressure than other portions of the chamber. The microthruster further includes an aerospike, which extends outwardly beyond the face of an outer wall of the closed chamber in the vicinity of the portion less resistant to rupture. It has been found that this microthruster improves the gas dynamics during propulsion for higher thrust efficiency and more controllable and uniform impulse characteristics. The microthruster is disclosed to be particularly useful as a propellant for a microsatellite.

SUMMARY OF THE INVENTION

According to the present invention, microthrusters, which have previously been proposed as a propulsion system for microsatellites, are used in spacecraft components to move parts of the spacecraft components with respect to one another. According to the present invention, the term "spacecraft component" encompasses, but is not limited to spacecraft booms, solar panels, antennas, payloads, instruments, sensors, satellite modules, separated hardware and star trackers. Such components have a plurality of parts connected to one another, at least a first part being mounted with respect to another of the parts. According to the present invention, at least one microthruster is provided on a first part and comprises a chamber, fluid provided in the chamber and a diaphragm covering an opening in the chamber. An array of such microthrusters can be used to provide a reliable and fine-tuneable movement or actuation system.

The parts of the spacecraft components can be mounted for linear movement with respect to one another and/or can be mounted for a pivoting motion with respect to one another. The spacecraft component can have first, second and third parts, the first part being mounted for linear movement with respect to the second part, and the second part being mounted for pivoting movement about the third part. The pivoting movement can be in two orthogonal directions about the third part, thereby providing movement in three dimensions. In this case, a microthruster or a microthruster array would be provided on the second part to provide the pivoting movement and a microthruster or microthruster array provided on the first part to provide the linear movement.

The microthruster used in the present invention can be of the type described in U.S. Pat. No. 6,131,385 or in copending application Ser. No. 09/449,427, now U.S. Pat. No. 6,487,844.

BRIEF DESCRIPTION OF THE DRAWINGS

FIGS. 7A and 7B are schematic plan views of a 2×2 array configuration of microthrusters shown in FIGS. 4 and 6, wherein the microthrusters are stacked together side by side to form the array configuration.

FIG. 8 is a cross-sectional view through a portion of a single wafer comprising a plurality of microthrusters shown in FIGS. 4 and 6, which are formed integrally as part of the wafer.

DETAILED DESCRIPTION OF DISCLOSED EMBODIMENT

Figure 1:
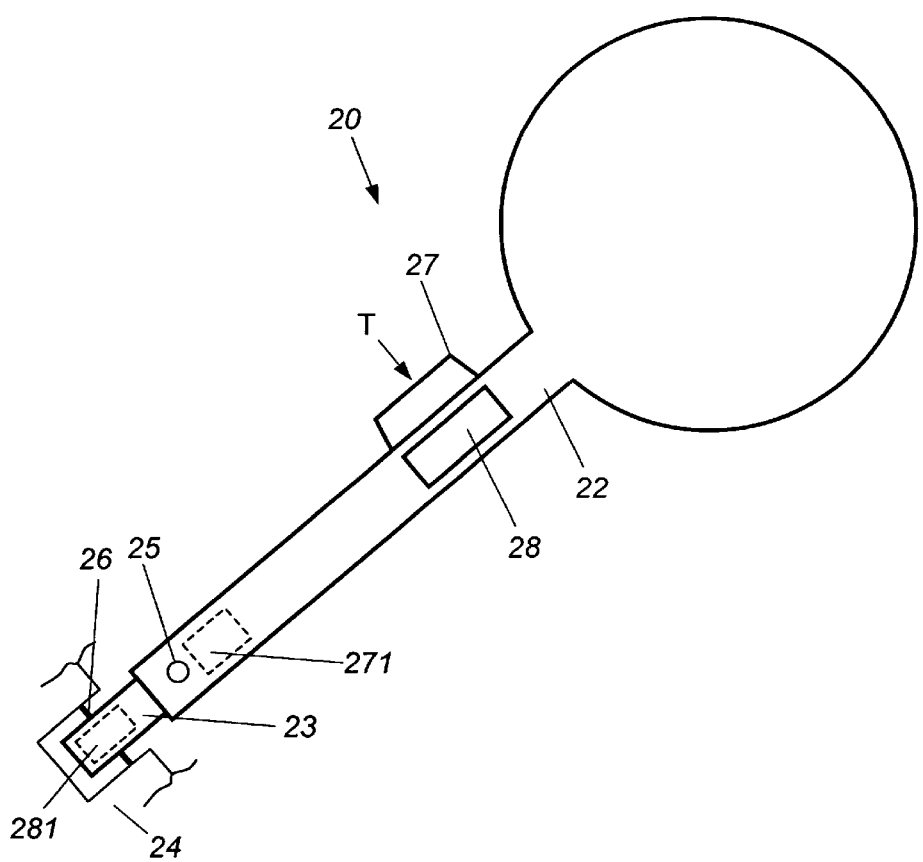
FIG. 1 is a schematic illustration of a spacecraft component having parts mounted for pivoting motion by use of a microthruster.
Figure 2:
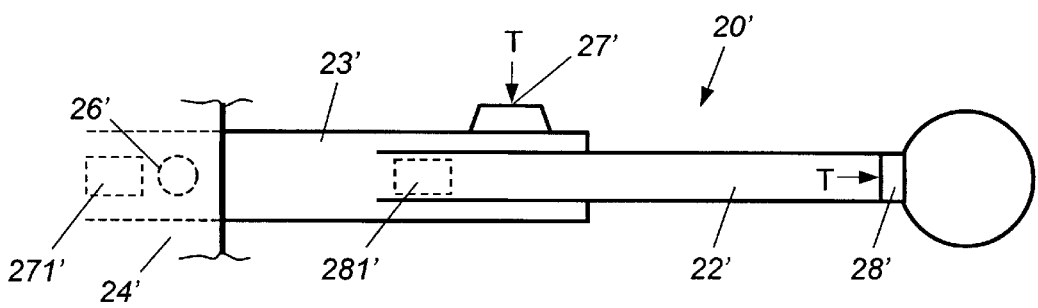
FIG. 2 is a schematic illustration of a spacecraft component according to the present invention having parts mounted for linear and/or pivoting movement with respect to one another using a microthruster.

FIG. 1 is a schematic illustration of a spacecraft component generally designated by the reference numeral 20. The spacecraft component can be, but is not limited to, spacecraft booms, solar panels, antennae, payloads, instruments, sensors, satellite modules, separated hardware and star trackers. Based on the following description, one skilled in the art would understand that other spacecraft components fall within the scope of the present invention. FIGS. 1 and 2 of the subject application show the spacecraft components 20 or 20' generically illustrated, such generic illustrations being intended to represent any of the aforementioned spacecraft components.

FIG. 1 shows a spacecraft component having at least a first part 22, a second part 23, and a third part 24. First part 22 is mounted for pivoting movement about second part 23. Specifically, first part 22 is mounted to pivot about pivot 25 connected to second part 23. In this example, second part 23 is also mounted for pivoting movement with respect to third part 24, i.e., about pivot 26. Pivots 25 and 26 can have pivot axes extending substantially orthogonal to one another.

In order to actuate the pivoting movement of first part 22 with respect to second part 23 about pivot 25, a microthruster or microthruster array 27 is provided on first part 22. Actuation of microthruster or microthruster array 27 in the manner described hereinafter creates a thrust in the direction T to move first part 22 about pivot 25 with respect to second part 23. A second microthruster or microthruster array 28 can also be provided on first part 22 in order to generate a thrust to cause first and second parts 22 and 23 to pivot about pivot 26 and move with a pivoting motion with respect to third part 24. In this manner, the first part 22 can be pivoted about two pivot axes orthogonal to one another. Of course, other pivoting mechanisms known in the art could be used to provide the same range of pivoting motion. For example, the first part 22 could be connected to the second part 23 or third part 24 with a ball and socket joint. The microthrusters or microthruster arrays 27, 28 can be used in place of or in addition to conventional mechanical actuators 271, 281. That is, the microthrusters or microthruster arrays 27, 28 can be used as the primary actuator for the spacecraft component 20 (in which case the conventional mechanical actuators 271, 281 are not included) or to fine-tune the mechanical activation of the conventional mechanical actuators 271, 281. Alternatively, the microthrusters or microthruster arrays 27, 28 can be used as a backup to the conventional mechanical actuators 271, 281. For example, the microthrusters or microthruster arrays 27, 28 can act as a "hammer tap" in space to provide a redundant system.

FIG. 2 is a schematic illustration of a spacecraft component generally designated by the reference 20'. Spacecraft component 20' includes first, second and third parts 22', 23' and 24', respectively. First part 22' is mounted for linear movement with respect to second part 23'. First and second parts 22' and 23' constitute, for example, a spacecraft boom. The boom can be extended, i.e., first part 22' moved with respect to second part 23', by the actuation of microthruster or microthruster array 28' to generate a thrust in the direction T, thereby extending the boom, i.e., extending the first part 22' from within the second part 23'.

In the embodiment shown in FIG. 2, the second part 23' is mounted for pivoting movement with respect to the third part 24' about pivot 26'. The microthruster array 27' can be used to generate a thrust force in the direction T to cause this pivoting motion. The microthrusters or microthruster arrays 27', 28' can be used in place of or in addition to conventional mechanical, actuators 271', 281'. That is, the microthrusters or microthruster arrays 27', 28' can be used as the primary actuator for the spacecraft component 20' (in which case the conventional mechanical actuators 271', 281' are not included) or to fine-tune the mechanical activation of the conventional mechanical actuators 271', 281'. Alternatively, the microthrusters or microthruster arrays 27', 28' can be used as a backup to the conventional mechanical actuators 271', 281'. For example, the microthrusters or microthruster arrays 27', 28' can act as a "hammer tap" in space to provide a redundant system.

The microthruster can be, for example, the microthruster disclosed in U.S. Pat. No. 6,131,385. Preferably, an array of such microthrusters is provided. Alternatively, the microthruster can be of the type disclosed in prior application Ser. No. 09/449,427. These microthrusters and microthruster arrays are described hereinafter.

Figure 3:
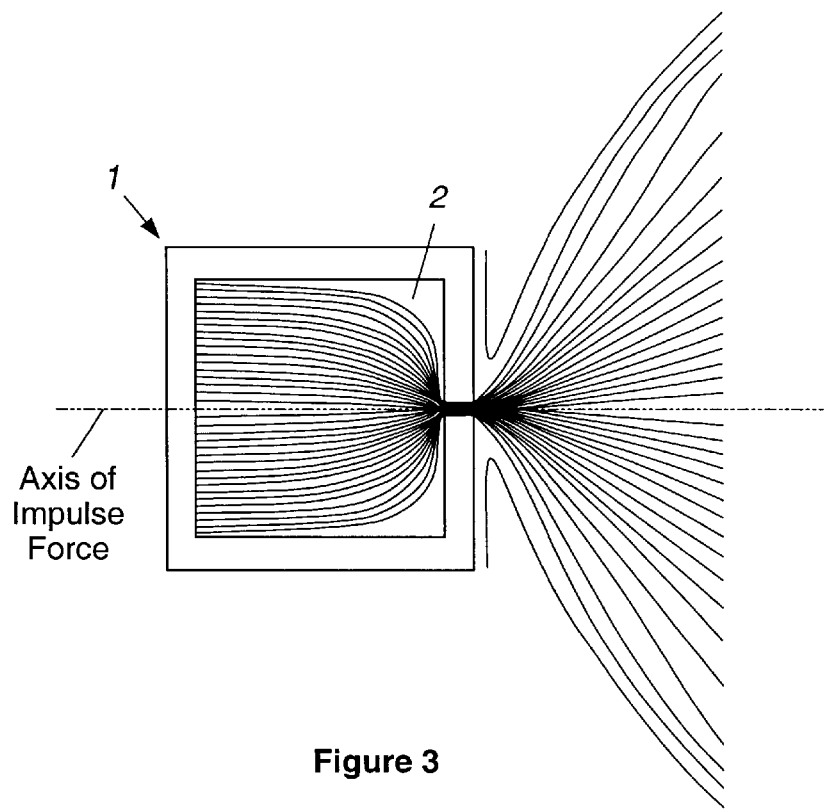
FIG. 3 is a schematic illustration of a microthruster without thrust augmentation, as in prior application Ser. No. 08/912,709, the microthruster being shown in cross-section through its chamber and depicting the streamline contours of the flow of the exhaust gas from the combustion chamber through the nozzle after rupture of the diaphragm or burst disk.
Figure 5:
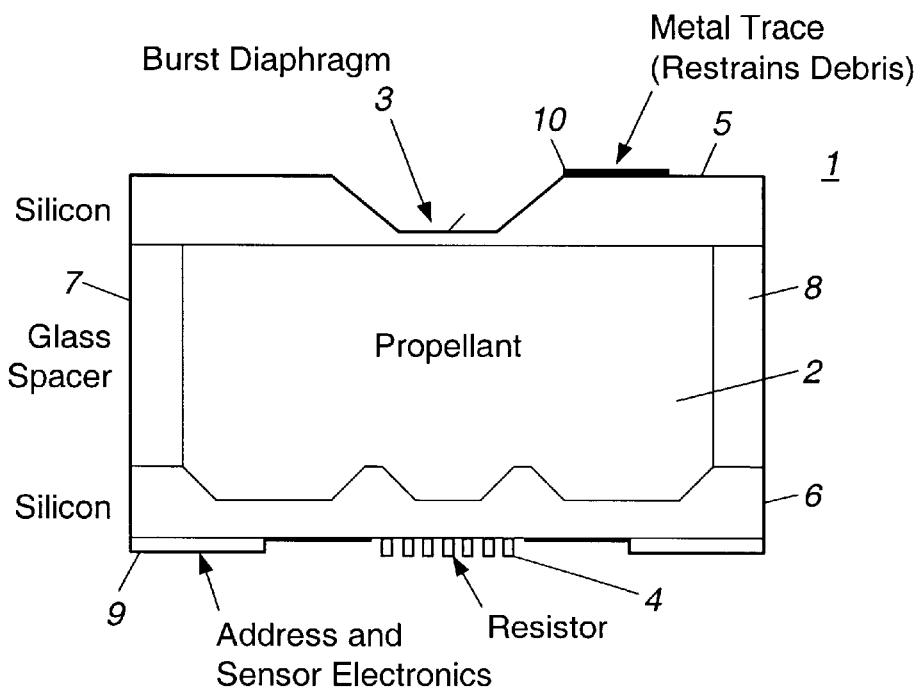
FIG. 5 is a sectional view of the microthruster of FIG. 3 shown before rupture of the diaphragm and expulsion of fluid propellant.

A microthruster 1, without thrust augmentation, of the type disclosed in commonly assigned U.S. patent application Ser. No. 08/912,709, filed Aug. 18, 1997, is shown in FIGS. 3 and 5. As disclosed in application Ser. No. 08/912,709, the microthruster 1 is an electric microthruster, particularly a resistojet thruster, formed with no moving parts. The present invention is not limited to this type of microthruster, but is disclosed in this context in a preferred embodiment.

The microthruster 1 is adapted to be fabricated by laser machining techniques, as well as batch processing techniques normally used for microelectronics. The microthruster 1 is subject to relatively precise control and is adapted to provide a unit of force analogous to a bit in a digital logic system and, thus, may be considered as a digital propulsion system. The magnitude of the unit of force may be controlled by the geometry of the chamber 2, the choice of propellant, as well as the number of microthrusters used in a particular application. Arrays of microthrusters can be formed with, for example, $10^4$–$10^6$ microthrusters per wafer or larger.

The chamber 2 is formed in a generally cube or other, for example, hexagonal, octagonal, pyramidal, cylindrical, hemispherical, spherical, conical, etc., shape, for carrying a fluid or gas, such as an inert gas, that is closed by a diaphragm 3 which, in the illustrated embodiment, is a portion of the chamber 2 with less resistance to rupture from elevated fluid pressure than other portions of the chamber. Thus, the diaphragm 3 acts as a blow-out disk. An electric resistance element 4 is disposed adjacent (or inside) a side of the chamber 2, opposite the diaphragm 3. When a gas propellant is placed within the chamber 2, thermal energy added to the gas by way of the electrical resistance element 4 causes the gas to expand. When the gas pressure expands to a pressure equivalent to the rupture pressure of the diaphragm 3, the diaphragm ruptures which, in turn, causes the gas to flow out of the chamber, acting as a propellant in the same sense as a punctured balloon. The wall of the chamber 2 about the ruptured diaphragm or burst disk 3 serves as a simple nozzle for the gases being expelled from the. microthruster.

As shown in more detail in FIG. 5, the chamber 2 of microthruster 1 may be formed by top and bottom wafers 5 and 6 of silicon or other suitable material such as silicon nitride, silicon dioxide, Forturan, to make up the wafered construction. The sidewalls of the chamber 2 may be formed by way of silicon or glass spacers 7 and 8 or other suitable materials. In order to provide relatively accurate control of the microthrusters 1, address and sensor electronics, generally identified with the reference number 9, can be integrated into the microthruster 1, as generally shown in FIG. 5. Thus, the amount of thrust can be relatively accurately controlled electronically in order to control the amount of force. In order to prevent debris from the diaphragm 3 from damaging the particular spacecraft component with which it is used, a metal trace 10 may be disposed adjacent the top layer of silicon 5.

Various propellants, including inert gases, suitable for use within the chamber 2, include nitrogen, argon, xenon, helium and carbon dioxide and other propellants including vaporizing liquid propellants and solid propellants. An igniter may also be used in the chamber to enhance performance. The amount of force generated by the microthruster 1 decreases as a function of the elemental size of the microthruster. The force is also a function of the particular gas employed. The predicted blow-down time for the microthruster 1 is dependent on the size of the microthruster, as well as the particular gas utilized. The emptying time is greater for larger size microthrusters. However, in any case, the blow-down time for the microthruster is a relatively short period, typically less than or equal to $10^3$ microseconds.

Figure 4:
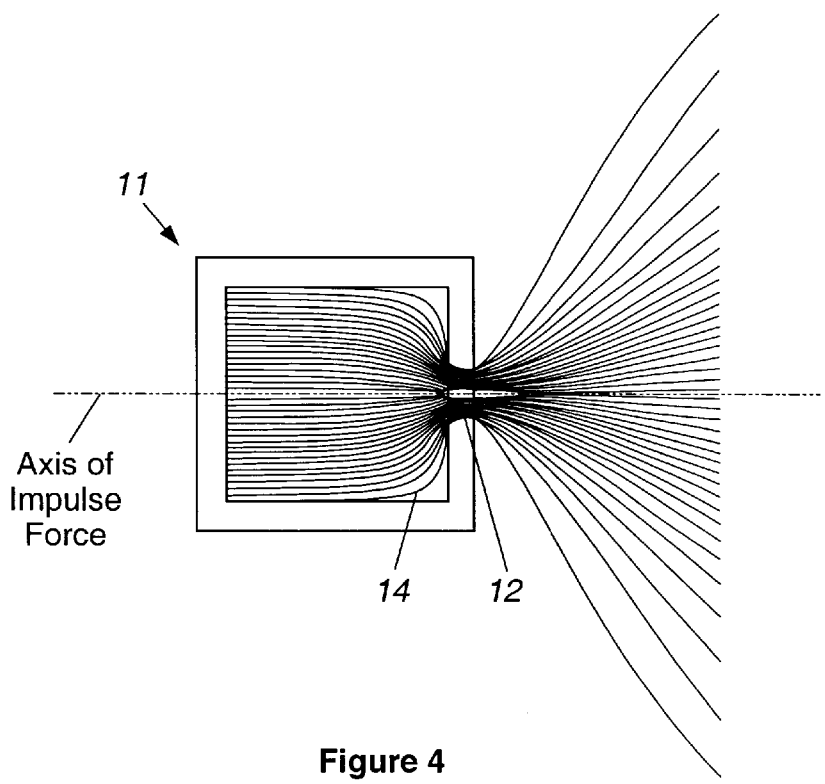
FIG. 4 is a schematic illustration similar to FIG. 1 of a microthruster with aerospike for thrust augmentation as in prior application Ser. No. 09/449,427, which is an improvement over the microthruster in FIG. 3, and wherein the aerospike extends outwardly beyond a face of an outer wall of the chamber between two diaphragms or burst disks which together form an exit section for fluid propellant from the chamber.
Figure 6:
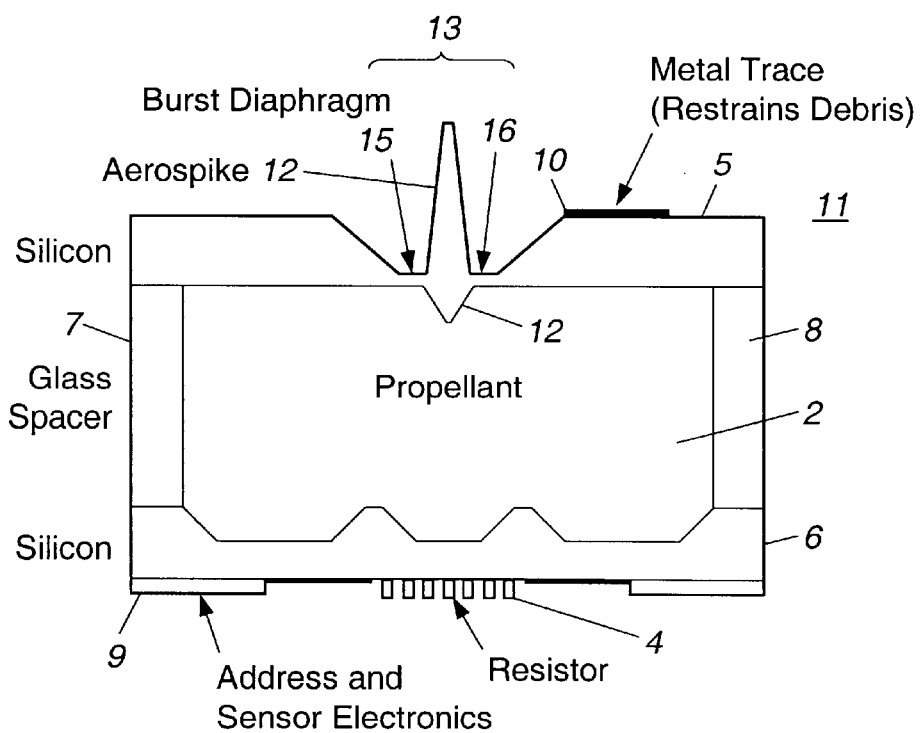
FIG. 6 is a sectional view of the microthruster of the present invention of FIG. 4 shown before rupture of the two diaphragms of the exit section and expulsion of the fluid propellant.

The microthruster 11 illustrated in FIGS. 4 and 6 of the drawings addresses two requirements for microthruster development: production of greater impulse and more controllable impulse as compared with that obtained with a microthruster with no thrust augmentation as in FIGS. 3 and 5. According to this embodiment, an aerospike 12 is formed integrally with the microthruster in the center of an exit section 13 of the chamber 14 of the microthruster. The exit section 13 is opened by use of two burst disks 15 and 16, which allow exit flow on either side of the body of the aerospike 12 to produce a higher impulse as compared with the microthruster shown in FIGS. 3 and 5. It has been calculated that the impulse of the microthruster 11 is 19% greater than that with the microthruster 1 in FIGS. 3 and 5 having only a simple nozzle opening. In addition, it has been found that the gas dynamics of the aerospike 12 provide more uniform impulse performance over a) altitude variations—the bit impulse will be relatively altitude-independent; and b) under an array configuration consisting of numerous linear impulse bits stacked together side by side—the inner array and outer arrays (which see different external pressure) will produce more uniform thrust and, hence, be more controllable, as compared with an array configuration of microthrusters without thrust augmentation.

In this embodiment, the aerospike 12 extending outwardly beyond a face of an outer wall of the chamber and is located centrally between the two adjacent diaphragms 15 and 16. The body of the aerospike 12 extends linearly outwardly in the disclosed form thereof and is tapered inwardly in the direction of its outer end with a straight taper. The axial length of the aerospike along the axis of the intended impulse from the chamber 14 is preferably at least approximately twice the wall thickness of the chamber as depicted in the drawings.

A 2×2 array configuration 17 comprising a plurality of the microthrusters 11 stacked together is illustrated in FIG. 7. The burst disks 15 and 16 of each microthruster 11 in the array are circular in form, as seen in the plan view of FIG. 7, and located on respective sides of the aerospike 12. Other array sizes could be employed, e.g., 5×3 or other to as large as 1000×1000 or larger, for example.

The microthruster 11 is preferably fabricated by batch microelectronic fabrication methods, as noted above.; For example, the fabrication techniques employed in making CMOS patterned electronics could be employed. In such case, the aerospike 12 is formed integrally with the chamber 14, as shown in FIGS. 4 and 6. FIG. 8 illustrates a portion of an array 18 of microthrusters 11, including a plurality of microthrusters, only two of which are shown, formed integrally, as part of a single wafer. The element size of the microthruster 11 in the disclosed embodiment is 900 $\mu$m×900 $\mu$m×1400 $\mu$m, but other sizes and shapes could be employed. An example of an igniter which can be provided in the gas filled chamber 14 of the microthruster to improve performance is lead styphnate, which is fired by a large current pulse through resistor 4 of the microthruster.

According to the present invention, the microthruster or microthruster array can be used as the primary actuator for the spacecraft component; that is, the movement, linear and/or pivoting, can be actuated solely by the microthruster or preferably, a microthruster array. This combines a reliable and flexible primary actuator and allows fine-tuning. By combining two pivot directions with linear movement, three dimensional deployment capability is achieved. The use of a microthruster or microthruster array can, according to the present invention, also augment or provide a back-up for mechanical actuation in the event a failure of the mechanical actuator is sensed. That is, the spacecraft component can be operated by actuating the mechanical actuator, determining whether the mechanical actuator provided a predetermined movement of at least the first part with respect to another of the parts, and, if the mechanical actuator has not successfully provided the predetermined movement of at least the first part with respect to another of the parts, actuating the at least one microthruster to provide a thrust to move at least the first part with respect to another of the parts. In augmenting mechanical activation, the microthruster array can be used to fine-tune the mechanical activation. As a backup, the microthruster or microthruster array can act as a "hammer tap" in space to provide a redundant system.

While we have shown and described a preferred embodiment of the microthruster according to the present invention, as will be recognized by one skilled in the art, many modifications and variations of the present invention are possible in light of the above teachings. Thus, it is to be understood that, within the scope of the appended claims, the invention may be practiced otherwise and as specifically described above.

What is claimed is:

1. A spacecraft component comprising a plurality of parts connected to one another, at least a first part being mounted for movement with respect to another of the parts, and at least one microthruster provided on the first part and comprising a chamber, a fluid provided in the chamber and a diaphragm covering an opening in the chamber.

2. The spacecraft component according to claim 1, wherein an array of microthrusters are provided on the first part, each of the microthrusters comprising a chamber, a fluid provided in the chamber and a diaphragm covering an opening in the chamber.

3. The spacecraft component according to claim 1, further comprising means for transferring thermal energy to the fluid in the chamber.

4. The spacecraft component according to claim 1, further comprising an electrical resistance element for transferring thermal energy to the fluid in the chamber.

5. The spacecraft component according to claim 1, wherein the first part is mounted for linear movement with respect to the another part.

6. The spacecraft component according to claim 5, wherein the first part is mounted within the another part and the at least one microthruster is provided on the first part to allow extension of the first part from the another part.

7. The spacecraft component according to claim 5, wherein the spacecraft component is a boom, and wherein the first part is mounted within the another part and the at least one microthruster is provided on the first part to allow extension of the first part from the another part.

8. The spacecraft component according to claim 1, wherein the first part is mounted for pivoting movement about the another part.

9. The spacecraft component according to claim 1, comprising at least first, second and third parts, wherein the first part is mounted for linear movement with respect to the second part, and wherein the second part is mounted for pivoting movement about the third part, and wherein at least one microthruster comprising a chamber, a fluid provided in the chamber and a diaphragm covering an opening in the chamber is further provided on the second part.

10. The spacecraft component according to claim 9, wherein the second part is mounted for pivoting movement in two orthogonal directions about the third part.

11. The spacecraft component according to claim 1, further comprising a mechanical actuator for moving the first part with respect to another of the parts, wherein the at least one microthruster serves as a redundant actuator for moving the first part with respect to another of the parts.

12. A method for operating a spacecraft component comprising:
   providing a spacecraft component comprising a plurality of parts connected to one another, at least a first part being mounted for movement with respect to another of the parts, and at least one microthruster provided on the first part and comprising a chamber, a fluid provided in the chamber and a diaphragm covering an opening in the chamber; and
   actuating the at least one microthruster to provide a thrust to move at least the first part with respect to another of the parts.

13. A method for operating a spacecraft component comprising:
   providing a spacecraft component comprising a plurality of parts connected to one another, at least a first part being mounted for movement with respect to another of the parts, a mechanical actuator for moving the first part with respect to another of the parts, and at least one microthruster provided on the first part and comprising a chamber, a fluid provided in the chamber and a diaphragm covering an opening in the chamber;
   actuating the mechanical actuator to provide primary movement of at least the first part with respect to another of the parts; and
   actuating the at least one microthruster to provide a thrust to fine tune the movement of at least the first part with respect to another of the parts.

14. A method for operating a spacecraft component comprising:
   providing a spacecraft component comprising a plurality of parts connected to one another, at least a first part being mounted for movement with respect to another of the parts, a mechanical actuator for moving the first part with respect to another of the parts, and at least one microthruster provided on the first part and comprising a chamber, a fluid provided in the chamber and a diaphragm covering an opening in the chamber;
   actuating the mechanical actuator;
   determining whether the mechanical actuator provided a predetermined movement of at least the first part with respect to another of the parts; and
   if the mechanical actuator has not successfully provided the predetermined movement of at least the first part with respect to another of the parts, actuating the at least one microthruster to provide a thrust to move at least the first part with respect to another of the parts.

* * * * *